United States Patent
Miyajima

(10) Patent No.: US 10,570,998 B2
(45) Date of Patent: Feb. 25, 2020

(54) CONTINUOUSLY VARIABLE TRANSMISSION

(71) Applicant: HONDA MOTOR CO., LTD., Tokyo (JP)

(72) Inventor: Toshiki Miyajima, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 366 days.

(21) Appl. No.: 15/564,031

(22) PCT Filed: Apr. 1, 2016

(86) PCT No.: PCT/JP2016/060938
§ 371 (c)(1),
(2) Date: Oct. 3, 2017

(87) PCT Pub. No.: WO2016/163320
PCT Pub. Date: Oct. 13, 2016

(65) Prior Publication Data
US 2018/0087629 A1 Mar. 29, 2018

(30) Foreign Application Priority Data
Apr. 6, 2015 (JP) ................... 2015-078033

(51) Int. Cl.
*F16H 9/12* (2006.01)
*F16H 55/49* (2006.01)
(Continued)

(52) U.S. Cl.
CPC ............. *F16H 9/125* (2013.01); *F16H 55/49* (2013.01); *F16H 55/56* (2013.01); *F16H 37/021* (2013.01); *F16H 61/14* (2013.01); *F16H 63/065* (2013.01)

(58) Field of Classification Search
CPC . F16H 9/02; F16H 9/125; F16H 55/49; F16H 55/56; F16H 37/021; F16H 61/14; F16H 63/065
See application file for complete search history.

(56) References Cited

U.S. PATENT DOCUMENTS 5,334,108 A * 8/1994 Lamers ................... F16H 9/125
474/28
6,017,285 A * 1/2000 Yasuhara ................ F16H 55/56
474/12
(Continued)

FOREIGN PATENT DOCUMENTS

JP  1-96568 U   6/1989
JP  2002-106659 A   4/2002
(Continued)

OTHER PUBLICATIONS

International Search Report dated Jul. 5, 2016, issued in counterpart International Application No. PCT/JP2016/060938 (2 pages).

*Primary Examiner* — Michael R Mansen
*Assistant Examiner* — Robert T Reese
(74) *Attorney, Agent, or Firm* — Westerman, Hattori, Daniels & Adrian, LLP

(57) ABSTRACT

A continuously variable transmission 1 includes: a primary pulley 20 including a nipping groove 22 receiving a V belt 12 wound across pulleys, the primary pulley 20 including a fixed half pulley 21 having a back side, opposite to the nipping groove 22, provided with a hollow part S; and a reinforcing member 41 having a center hole receiving a driving shaft 11 and tapering from an outer circumference side toward an inner circumference side to have an annular conical shape. The reinforcing member 41 has an outer circumference side end portion 41a brought into contact with and attached to an outer circumference side end surface Sa of the hollow part S and has an inner circumference side
(Continued)

end portion 41*b* attached to an inner circumference side end surface Sb of the hollow part S via a holding member 42 having a wedge-shaped cross section.

10 Claims, 9 Drawing Sheets

(51) Int. Cl.
  *F16H 63/06* (2006.01)
  *F16H 55/56* (2006.01)
  F16H 37/02 (2006.01)
  F16H 61/14 (2006.01)

(56) References Cited

U.S. PATENT DOCUMENTS

| | | | |
|---|---|---|---|
| 6,106,422 A | 8/2000 | Arai | |
| 6,129,643 A * | 10/2000 | Tamagawa | F16H 55/56 |
| | | | 474/10 |
| 6,248,035 B1 * | 6/2001 | Bartlett | F16H 55/56 |
| | | | 474/100 |
| 6,585,615 B2 * | 7/2003 | Uota | F16H 15/42 |
| | | | 474/17 |
| 7,338,398 B2 * | 3/2008 | Whiting | F16F 1/324 |
| | | | 267/161 |
| 9,163,708 B2 * | 10/2015 | Yamane | F16H 55/56 |

FOREIGN PATENT DOCUMENTS

| | | | |
|---|---|---|---|
| JP | 3717271 B2 | 11/2005 | |
| JP | 2013-47535 A | 3/2013 | |

* cited by examiner

CONTINUOUSLY VARIABLE TRANSMISSION

TECHNICAL FIELD

The present invention relates to a continuously variable transmission having a decelerator and an accelerator combined to a belt type continuously variable transmission mechanism including a pulley and a belt, and more particularly relates to a continuously variable transmission having a pulley structure designed for weight reduction.

BACKGROUND ART

A belt type continuously variable transmission having a transmission combined to a belt type continuously variable transmission mechanism via a plurality of clutches has been known (see for example, Patent Document 1). The belt type continuously variable transmission mechanism has an endless belt wound across a pair of pulleys. The transmission includes a gear train having a plurality of gears meshed with each other. The pulleys in Patent document 1 each have half pulleys, biased toward each other with a disc spring, each having a solid structure and a conical shape. The solid structure of the conical pulley results in a heavy weight. Thus, a reduction in the weight of the pulleys has been called for.

RELATED ART DOCUMENTS

Patent Documents

[Patent document 1]

Patent document 1: Japanese Patent No. 3717271

DISCLOSURE OF THE INVENTION

The weight of the pulleys can be reduced by reducing the thickness of the half pulleys. However, this leads to lower rigidity. Thus, a simple reduction in the mass of the half pulleys would lead to a failure to ensure sufficient rigidity of the half pulleys, resulting in the pulleys with insufficient strength.

The present invention has been made in view of the foregoing points, and aims at providing a continuously variable transmission including half pulleys that can have a weight reduced without having the strength compromised.

Means of Solving the Problems

A continuously variable transmission (1) according to the present invention includes a rotation shaft (11, 18); a pair of pulleys (20, 50) provided on the rotation shaft (11, 18), the pulleys including nipping grooves (22, 52) receiving an endless transmission belt (12) wound across the pulleys, the pulleys (20, 50) including half pulleys including at least one half pulley (21, 25, 51, 55) having a back side, opposite to the nipping groove (22, 52), provided with a hollow part (S); and a reinforcing member (41) having a center hole receiving the rotation shaft (11, 18) and tapering from an outer circumference side toward an inner circumference side to have an annular conical shape. The reinforcing member (41) has an outer circumference side end portion (41a) brought into contact with and attached to an outer circumference side end surface (Sa) of the hollow part (5) and has an inner circumference side end portion (41b) attached to an inner circumference side end surface (Sb) of the hollow part (S) via a holding member (42) having a wedge-shaped cross section.

The half pulley (21, 25, 51, 55) provided with the hollow part (S) as described above can have a reduced thickness leading to a reduced weight. The reinforcing member (41) having a shape of a conical tube is provided over the area between the outer circumference side end surface (Sa) and the inner circumference side end surface (Sb) to cover the back side of the hollow part (S) of the half pulley (21, 25, 51, 55). With the holding member (42) having a wedge-shaped cross section provided, the inner circumference side end portion (41b) of the reinforcing member (41) can be tightly secured to the reinforcing member (41). This ensures the reinforcement by the reinforcing member (41) covering the end surfaces (Sa, Sb) of the hollow part (5). Thus, the strength of the half pulley (21, 25, 51, 55) can be maintained. All things considered, the half pulley (21, 25, 51 55) can have a reduced weight without having the strength compromised.

In the above-described continuously variable transmission (1), the outer circumference side end portion (41a) and the inner circumference side end portion (41b) of the reinforcing member (41) may have tapered surfaces with same inclined angles (θa, θb) relative to the rotation shaft (11, 18). With the tapered surfaces formed with the same inclined angles, the reinforcing member (41), secured with the holding member (42), can effectively be pressed against the outer circumference side end surface (Sa) of the hollow part (S). This ensures the reinforcing member (41) is secured.

In the above-described continuously variable transmission (1), the reinforcing member (41) may be formed to have a cross-sectional area increasing from the outer circumference side end portion (41a) toward the inner circumference side end portion (41b). The reinforcing member (41) having a larger cross-sectional area on the inner circumference side than on the outer circumference side can have higher durability with surface pressure applied from the holding member (42) to the inner circumference side end portion (41b) of the reinforcing member (41) dispersed.

In the above-described continuously variable transmission (1), the reinforcing member (41) may be made of a material having a Young's modulus higher than that of a material of the half pulleys (21, 25, 51, 55). For example, if the half pulley (21, 25, 51, 55) is made of steel, the reinforcing member (41) made of industrial ceramic such as alumina with a higher Young's modulus has a lower risk of deformation. Thus, the reinforcing member (41) maintains the posture of the half pulley (21, 25, 51, 55) to ensure no deformation of the conical surface of the half pulley (21, 25, 51, 55) on the side of the nipping groove 22.

In the above-described continuously variable transmission (1), a shaft bearing (80) may be provided adjacent to the back side of at least one fixed half pulley (21, 51) of the pulleys (20, 50), and a biasing member (43) that biases holding member (42) toward the nipping groove (22, 52) may be disposed between the holding member (42) and a part (82) of the shaft bearing (80). The biasing member (43), such as a disc spring, biasing the holding member (42) toward the nipping groove (22, 52), ensures the biasing member (43) is supported. This also ensures the reinforcement of the half pulley (21, 51) by the reinforcing member (41) is secured with the holding member (42).

In the above-described continuously variable transmission (1), a shaft bearing (80) may be provided adjacent to the back side of at least one fixed half pulley (21, 51) of the pulleys (20, 50), and a fastening member (44) that restricts a position of the holding member (42) in a direction along the rotation shaft (11, 18) may be provided between the holding member (42) and a part (82) of the shaft bearing (80). The fastening member (44), such as a nut, making the holding member (42) supported at a certain position in the direction along the rotation shaft (11, 18) by fastening ensures the holding member 42 does not move toward the back side to eventually fall off, and thus ensures the holding member (42) is secured. This also ensures the reinforcement of the half pulley (21, 51) by the reinforcing member (41) secured with the holding member (42).

In the above-described continuously variable transmission (1), a shaft bearing (80) may be provided adjacent to the back side of at least one fixed half pulley (21, 51) of the pulleys (20, 50), and the holding member (42) may come into contact with a part (82) of the shaft bearing (80) having a position in a direction along the rotation shaft (11, 18) restricted with a stopper member (45). The bearing (80) and the stopper member (45) for the bearing (80) is provided on the driving shaft (11, 18) of the continuously variable transmission (1). A side surface of the part (82) of the shaft bearing (80) thus provided may also be utilized to prevent the holding member holding member (42) from falling off. This ensures the holding member (42) is supported without increasing the number of parts. This also ensures the reinforcement of the half pulley (21, 51) by the reinforcing member (41) secured with the holding member (42).

In the above-described continuously variable transmission (1), the holding member (42) for at least one movable half pulley (25, 55) of the pulleys (20, 50) may have a position in a direction along the rotation shaft (11, 18) restricted with a stopper member (46) that restricts a position in the direction along the rotation shaft (11, 18). The stopper member (46), such as a circlip, fixing the position of the holding member (42) in the direction along the rotation shaft (11, 18) ensures the holding member (42) is supported. This also ensures the reinforcement of the half pulley (25, 55) by the reinforcing member (41) secured with the holding member (42).

In the above-described continuously variable transmission (1), the reinforcing member (41) for at least one movable half pulley (25, 55) of the pulleys (20, 50) may be provided with a pressure regulation port (41P) serving as an entrance for a hydraulic fluid for operating the movable half pulley (25, 55). The hydraulic pressure chamber (31) containing hydraulic fluid is disposed on the back side of the reinforcing member (41) of the movable half pulley (25, 55). With the pressure regulation port (41P) provided as described above, the pressure difference between the hydraulic pressure chamber (31) and the hollow part (S) can be eliminated. When the reinforcing member (41) might deform due to a pressure difference, caused by hydraulic pressure, between inner and outer sides of a surface of the reinforcing member (41), the pressure difference may be thus eliminated to reduce the load on the reinforcing member (41).

In the above-described continuously variable transmission (1), at least one movable half pulley (25, 55) of the pulleys (20, 50) may be provided with a pressure regulation port (25P, 55P). Thus, a pressure difference involving the pressure in the hollow part (S) of the movable half pulley (25, 55) can be utilized to effectively retain the reinforcing member (41). The above reference numerals put in brackets are ones which illustrate corresponding components or the like in embodiments described later as an example of the present invention.

Effects of the Invention

With the continuously variable transmission mechanism according to the present invention, a continuously variable transmission including half pulleys with a weight reduced without compromising the strength of the half pulleys can be provided.

MODES FOR CARRYING OUT THE INVENTION

[First Embodiment]

Figure 1:
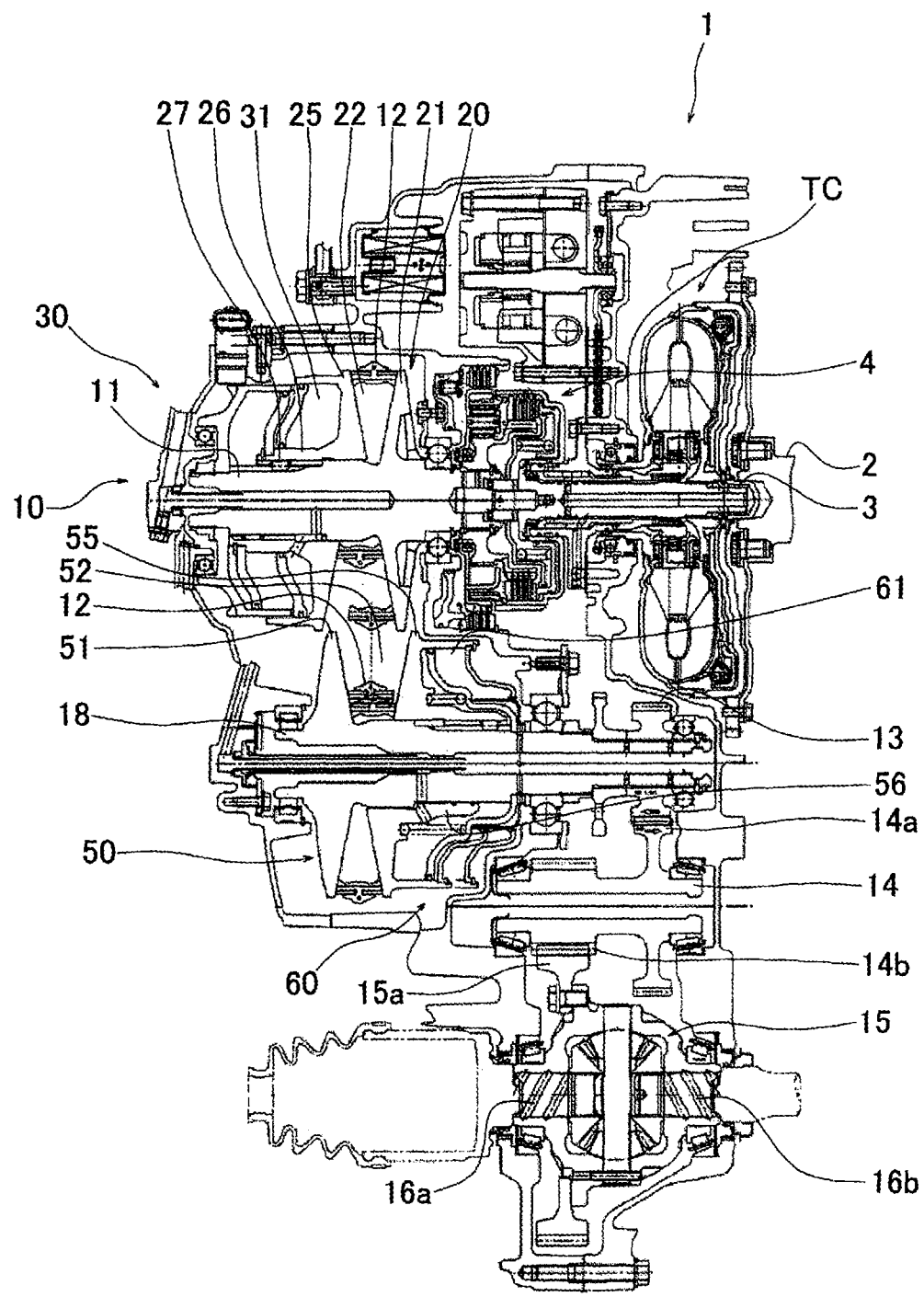
FIG. 1 is a main cross-sectional view illustrating an example of the overall configuration of a transmission including a belt type continuously variable transmission mechanism including a pulley structure according to a first embodiment of the present invention.

A first embodiment of the present invention is described in detail below with reference to the accompanying drawings. FIG. 1 is a main cross-sectional view illustrating an example of the overall configuration of an automatic transmission (hereinafter, simply referred to as a "continuously variable transmission 1") including a belt type continuously variable transmission (CVT) mechanism 10 including a pulley structure according to the first embodiment of the present invention. The continuously variable transmission 1 illustrated in the figure includes an input shaft 3. The input shaft 3 receives driving force from an engine (not illustrated) via a crank shaft 2. The input shaft 3 is provided with a torque converter TC. A forward/backward switching mechanism 4 including a planetary gear mechanism, a clutch, and a brake mechanism is provided on the downstream side (output side) of the torque converter TC. The belt type continuously variable transmission mechanism 10 is provided on the downstream side of the forward/backward switching mechanism 4. The belt type continuously variable transmission mechanism 10 includes a primary pulley 20, a secondary pulley 50, and a V belt 12 (endless transmission belt) that is an endless belt wound across the primary pulley 20 and the secondary pulley 50 serving as a pair of pulleys.

The primary pulley 20 is provided on a driving shaft 11 serving as a rotation shaft coaxially arranged with the input shaft 3. The secondary pulley 50 is provided on a driven shaft 18 serving as a rotation shaft. The driving shaft 11 and the driven shaft 18 are disposed in parallel with each other with a given distance in between.

The primary pulley 20 of the belt type continuously variable transmission mechanism 10 includes a fixed half pulley 21 and a movable half pulley 25. The fixed half pulley 21 and the movable half pulley 25 define a nipping groove 22 for nipping the V belt 12 in between. The fixed half pulley 21 is integrally secured on the driving shaft 11. The movable half pulley 25 includes a flange part 26 having a cylindrical shape and extending in a direction opposite to the fixed half pulley 21 along an axial direction. The flange part 26 is in spline engagement (roller spline engagement) with the driving shaft 11 via a roller part 27 (roller spline). Thus, the movable half pulley 25 attached to the driving shaft 11 is relatively unrotatable but is movable in the axial direction. The movable half pulley 25 can be driven by a hydraulic actuator mechanism 30. In the present embodiment, the hydraulic actuator mechanism 30 has a double piston mechanism. However, this configuration is only exemplary and should not be construed in a limiting sense.

The secondary pulley 50 includes a fixed half pulley 51 and a movable half pulley 55. The fixed half pulley 51 and the movable half pulley 55 define a nipping groove 52 for nipping the V belt 12 in between. The fixed half pulley 51 is integrally secured on the driven shaft 18. The movable half pulley 55 includes a flange part 56 having a cylindrical shape and extending in a direction opposite to the fixed half pulley 51 along the axial direction. The flange part 56 is in spline engagement with the driven shaft 18 via a roller part 57. Thus, the movable half pulley 55 attached to the driven shaft 18 is relatively unrotatable but is movable in the axial direction. The movable half pulley 55 can be driven by a hydraulic actuator mechanism 60 having a hydraulic pressure chamber 61. In the present embodiment, the hydraulic actuator mechanism 60 has a double piston mechanism. However, this configuration is only exemplary and should not be construed in a limiting sense.

A driving gear 13 is secured to an end portion of the driven shaft 18. The driving gear 13 drives drive shafts 16a and 16b, extending to wheels (not illustrated), via an idler gear 14a and a pinion gear 14b, provided to an idler shaft 14, as well as a final gear 15a of a differential device 15.

Figure 2:
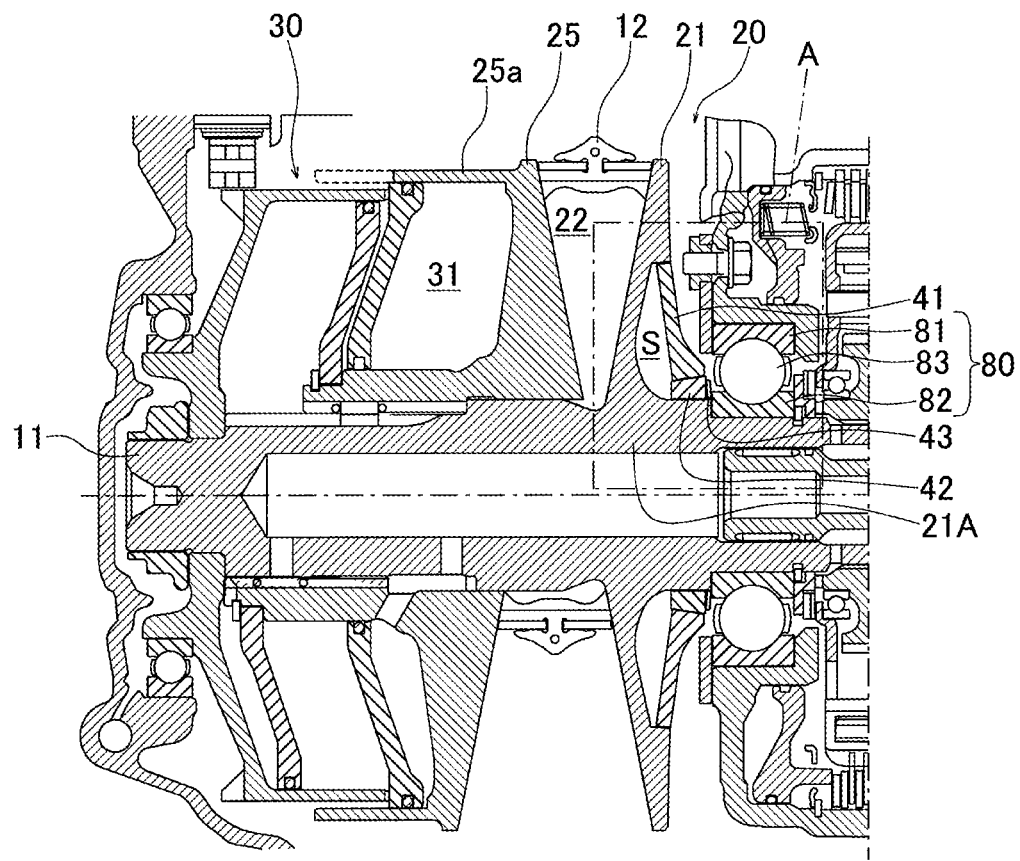
FIG. 2 is an enlarged cross-sectional view illustrating a structure around a primary pulley according to the first embodiment.

The pulley structure according to the present embodiment is described below with the primary pulley 20 as an example. FIG. 2 is an enlarged cross-sectional view illustrating a structure around the primary pulley 20 according to the first embodiment. The primary pulley 20 illustrated in FIG. 2 has an upper half portion and a lower half portion different from each other in a width of a groove for receiving the V belt 12. Specifically, the primary pulley 20 has the upper half portion and the lower half portion each having a small width of the groove defined between the fixed half pulley 21 and the movable half pulley 25. The primary pulley 20 and the secondary pulley 50 may have the same configuration and thus the configuration of only the primary pulley 20 is described below. As used in the following description, the term "back side" indicates the side opposite to the nipping groove 22.

The primary pulley 20 illustrated in FIG. 2 includes the fixed half pulley 21 and the movable half pulley 25 as described above. The fixed half pulley 21 has a thickness increasing from an outer circumference side toward an inner circumference 21A in a cross-sectional view, to have a conical outer shape. The fixed half pulley 21 is formed by a process involving what is known as lightening to have a slope portion on the back side provided with a hollow part S to be hollow inside. The fixed half pulley 21 has a slope portion, on the side of the nipping groove 22, having a thickness increased toward the inner circumference side, with the thickness of the hollow part S reducing toward the inner circumference side. The hollow part S is covered by a reinforcing member 41 provided over the area between the outer circumference side and the inner circumference side.

The reinforcing member 41 has a center hole for receiving the driving shaft 11, and tapers from the outer circumference side toward the inner circumference side to have an annular conical outer shape. The reinforcing member 41 is made of a material with a Young's modulus higher than that of a material of the fixed half pulley 21 as a reinforcement target. For example, when the fixed half pulley 21 is made of steel, the reinforcing material is preferably made of industrial ceramic such as aluminum oxide with a higher Young's modulus. The ceramic material also features high resistance against compression load and thus is also preferable in this point for the reinforcing member 41 requiring such a feature.

The reinforcing member 41 is secured to the inner circumference 21A of the fixed half pulley 21 via a holding member 42 or the like. The holding member 42 is an annular (collar shaped) member disposed between the inner circumference of the reinforcing member 41 and the inner circumference 21A of the fixed half pulley 21, and serves as an intermediate joint. How the reinforcing member 41 and the holding member 42 are secured is described in detail later.

A bearing 80 (shaft bearing) is disposed adjacent to the back side of the fixed half pulley 21. The bearing 80 includes an outer race 81 on an outer ring side, an inner race 82 on an inner ring side, and a ball 83 between the races. The inner race 82, which is a part of the bearing 80, is secured to the inner circumference 21A of the fixed half pulley 21 integrated with the driving shaft 11. The movable half pulley 25 further includes a movable cylindrical portion 25a that has a substantially cylindrical shape and extends toward the back side. The movable cylindrical portion 25a is disposed to surround a hydraulic pressure chamber 31 of the hydraulic actuator mechanism 30. The movable half pulley 25 moves toward the driving shaft 11 due to hydraulic pressure of a hydraulic fluid supplied to the hydraulic pressure chamber 31.

Figure 3:
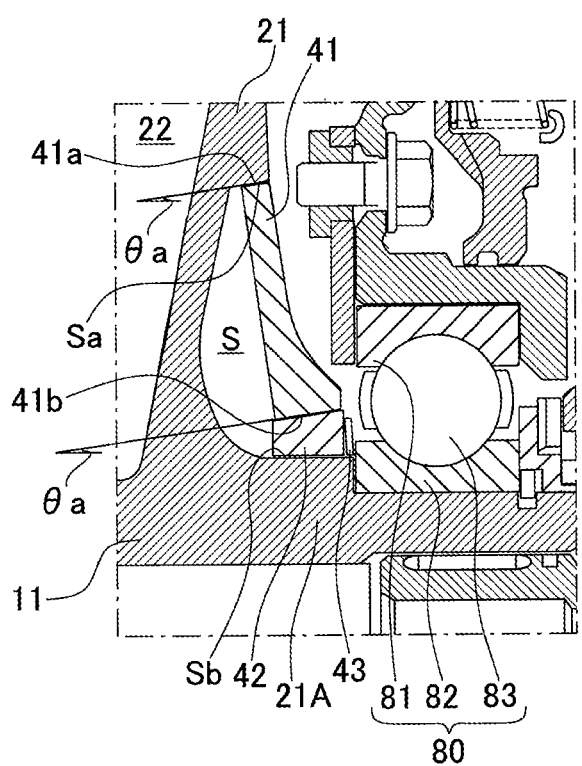
FIG. 3 is a partially enlarged view of a section A in FIG. 2, illustrating an example of a configuration around a fixed half pulley according to the first embodiment in detail.

FIG. 3 is a partially enlarged view of a section A in FIG. 2, illustrating an example of a configuration around the fixed half pulley 21 according to the first embodiment in detail. As illustrated in FIG. 3, the reinforcing member 41 has an outer circumference side end portion 41a brought into contact with and attached to an outer circumference side end surface Sa of the hollow part S, and has an inner circumference side end portion 41b attached to an inner circumference side end surface Sb of the hollow part S via the holding member 42 having a wedge-shaped cross section. The outer circumference side end portion 41a and the inner circumference side end portion 41b both have tapered surfaces. The outer circumference side end portion 41a is tapered relative to the driving shaft 11 to have a tapered surface with an inclined angle $\theta a$ that is the same as an inclined angle $\theta b$ of a tapered surface of the inner circumference side end portion 41b relative to the driving shaft 11. The reinforcing member 41 is formed to have a cross-sectional area gradually increasing from the outer circumference side end portion 41a toward the inner circumference side end portion 41b. A biasing member 43 such as a disc spring that biases the holding member 42 toward the nipping groove 22 is provided between the holding member 42 and the inner race 82 of the bearing 80.

The continuously variable transmission 1 according to the present embodiment having the configuration described above has the fixed half pulley 21 having the hollow part S to have a reduced thickness, and thus can have a reduced weight. The reinforcing member 41, having a conical tube shape, covers the area between the outer circumference side end surface Sa and the inner circumference side end surface Sb, on the back side of the hollow part S of the fixed half pulley 21. The inner circumference side end portion 41b of the reinforcing member 41 is tightly secured to the reinforcing member 41 via the holding member 42 having the wedge-shaped cross section. This ensures reinforcement by the reinforcing member 41 covering the outer circumference side end surface Sa and the inner circumference side end surface Sb of the hollow part S. Thus, the strength of the fixed half pulley 21 is not compromised. All things considered, the fixed half pulley 21 can have a weight reduced without having the strength compromised. Parts of this configuration and later described configuration of the fixed half pulley 21 can be similarly applied to the fixed half pulley 51.

In the present embodiment, the reinforcing member 41 includes the outer and the inner circumference side end portions 41a and 41b having tapered surfaces with the same inclined angles $\theta a$ and $\theta b$ relative to the driving shaft 11. With the tapered surface formed by the uniform inclined angle, the reinforcing member 41 can be secured via the holding member 42 having the wedge-shaped cross section to be effectively pressed against the outer circumference side end surface Sa of the hollow part S. This ensures the reinforcing member 41 is secured.

The reinforcing member 41 is formed to have a cross-sectional area gradually increasing from the outer circumference side end portion 41a toward the inner circumference side end portion 41b. The reinforcing member 41 having a larger cross-sectional area on the inner circumference side than on the outer circumference side can have higher durability with surface pressure applied from the holding member 42 on the inner circumference side end portion 41b of the reinforcing member 41 dispersed.

The reinforcing member 41 may be made of a material with a Young's modulus higher than that of a material of the fixed half pulley 21. For example, if the fixed half pulley 21 is made of steel, the reinforcing member 41 made of industrial ceramic such as alumina with a higher Young's modulus has a lower risk of deformation. Thus, the reinforcing member 41 maintains the posture of the fixed half pulley 21 to ensure no deformation of the conical surface of the fixed half pulley 21 on the side of the nipping groove 22.

The bearing 80 may be disposed adjacent to the back side of at least one half pulley including the fixed half pulley 21 of the primary pulley 20. The biasing member 43 that biases the holding member 42 toward the nipping groove 22 may be provided between the holding member 42 and the inner race 82 serving as a part of the bearing 80. The biasing member 43 such as a disc spring biasing the holding member 42 toward the nipping groove 22 can ensure the holding member 42 is supported. This further ensures the reinforcement of the fixed half pulley 21 by the reinforcing member 41 secured by the holding member 42.

Figure 4:
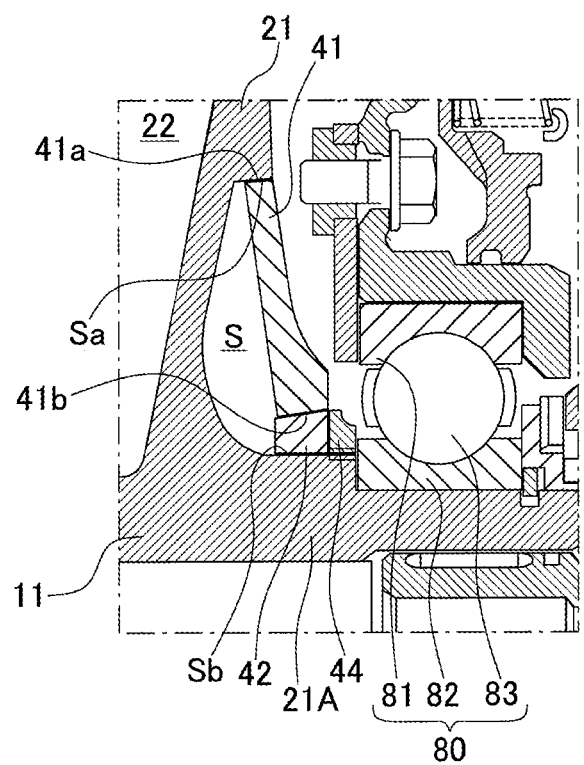
FIG. 4 is a diagram illustrating an example of a configuration according to a modification of the first embodiment.
Figure 5:
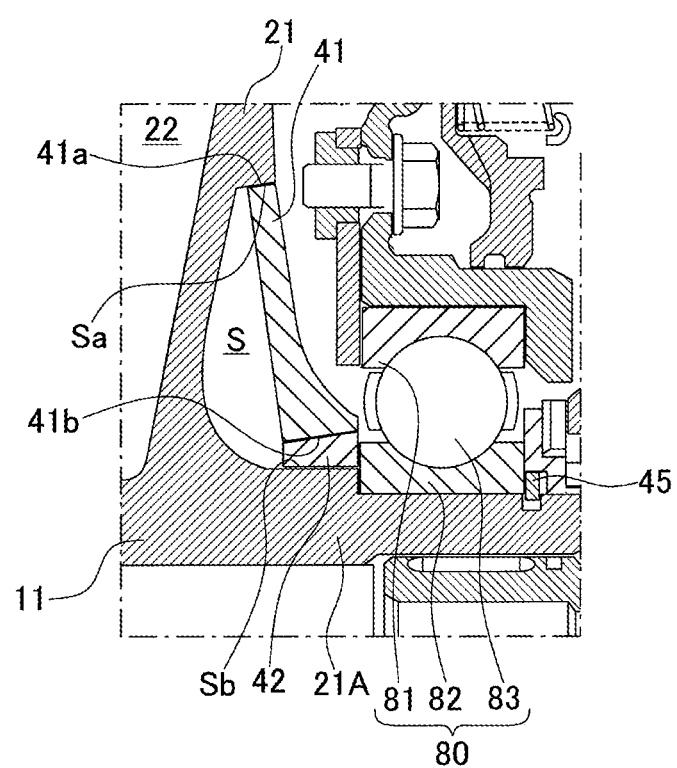
FIG. 5 is a diagram illustrating an example of a configuration according to another modification of the first embodiment.

In the first embodiment described above, the biasing member 43 is used for ensuring the holding member 42 is supported. However, this should not be construed in a limiting sense. Next, a modification of the first embodiment will be described. FIG. 4 and FIG. 5 are each a diagram illustrating an example of a configuration according to a modification of the first embodiment. As illustrated in FIG. 4, the holding member 42 may have the position in the direction along the driving shaft 11 restricted with a fastening member 44 such as a nut provided on the back side of the holding member 42. The fastening member 44 such as a nut, making the holding member 42 supported at a certain position in the direction along the driving shaft 11 ensures the holding member 42 does no move toward the back side to eventually fall off. This ensures the holding member 42 is supported. This further ensures the reinforcement of the fixed half pulley 21 by the reinforcing member 41 secured by the holding member 42.

As illustrated in FIG. 5, the holding member 42 may be in contact with the inner race 82 serving as a part of the bearing 80 that may have the position in the direction along the driving shaft 11 restricted with a stopper member 45 such as a circlip disposed on the back side of the inner race 82. The bearing 80 and the stopper member 45 for the bearing 80 are provided on the driving shaft 11 of the continuously variable transmission 1. A side surface of the inner race 82 of the bearing 80 thus provided may also be utilized to prevent the holding member 42 from falling off. This ensures the holding member 42 is supported without increasing the number of parts. This further ensures the reinforcement of the fixed half pulley 21 by the reinforcing member 41 secured by the holding member 42.

[Second Embodiment]

Next, a second embodiment of the present invention is described. In the description and the drawings corresponding to the second embodiment, components that are the same as or similar to the counterparts in the first embodiment are denoted with the same reference signs, and will not be described in detail below. Matters not described below are the same as those in the first embodiment. In the first embodiment, the configuration related to the fixed half pulley 21 is described as an example of the detailed configuration. In the second embodiment, the configuration of the movable half pulley 25 is mainly described as an example of the detail configuration. The configuration of the movable half pulley 25 of the primary pulley 20 that is mainly described as an example may be similarly applied to the movable half pulley 55 of the secondary pulley 50.

Figure 6:
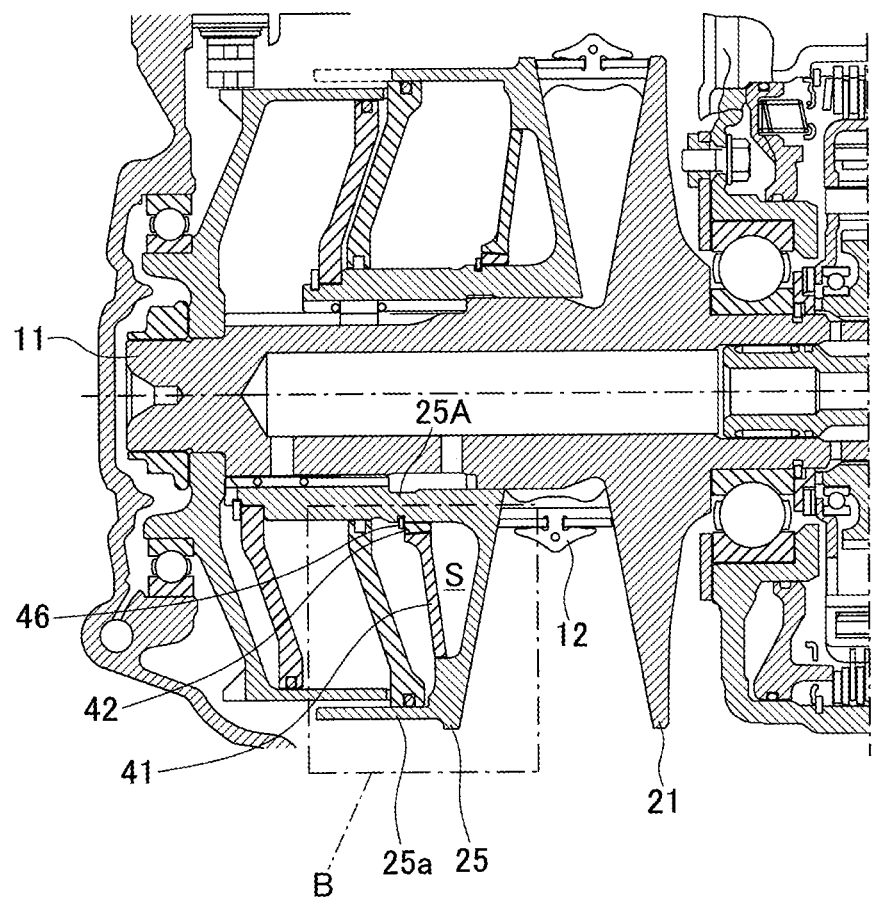
FIG. 6 is an enlarged cross-sectional view illustrating a configuration around the primary pulley according to a second embodiment.

FIG. 6 is an enlarged cross-sectional view illustrating a configuration around the primary pulley 20 according to the second embodiment. As illustrated in FIG. 6, the primary pulley 20 includes the fixed half pulley 21 and the movable half pulley 25 as described above. The movable half pulley 25 has a thickness increasing from the outer circumference side toward an inner circumference 25A in a cross-sectional view, to have a conical outer shape. The movable half pulley 25 has a slope portion on the back side provided with the hollow part S to be hollow inside. The hollow part S is covered by the reinforcing member 41 provided over the area between the outer circumference side and the inner circumference side. The reinforcing member 41 is secured to the inner circumference 25A of the movable half pulley 25 by the holding member 42 and the like. The holding member 42 is disposed between the inner circumference of the reinforcing member 41 and the inner circumference 25A of the movable half pulley 25. The holding member 42 is secured to the inner circumference 25A by a stopper member 46. Next, how the reinforcing member 41 and the holding member 42 are secured is described in detail.

Figure 7:
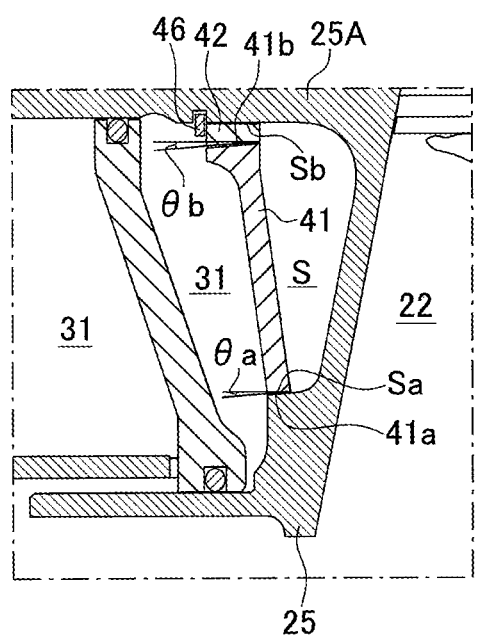
FIG. 7 is a partially enlarged view of a section B in FIG. 6, illustrating an example of a configuration around the movable half pulley according to the second embodiment in detail.

FIG. 7 is a partially enlarged view of a section B in FIG. 6, illustrating an example of a configuration around the movable half pulley 25 according to the second embodiment in detail. As illustrated in FIG. 7, the reinforcing member 41 has the outer circumference side end portion 41a brought into contact with and attached to the outer circumference side end surface Sa of the hollow part S, and has the inner circumference side end portion 41b attached to the inner circumference side end surface Sb of the hollow part S via the holding member 42 having the wedge-shaped cross section. The outer circumference side end portion 41a and the inner circumference side end portion 41b both have tapered surfaces. The outer circumference side end portion 41a is tapered relative to the driving shaft 11 to have a tapered surface with an inclined angle θa that is the same as the inclined angle θb of the tapered surface of the inner circumference side end portion 41b relative to the driving shaft 11. The reinforcing member 41 is formed to have a cross-sectional area gradually increasing from the outer circumference side end portion 41a toward the inner circumference side end portion 41b. The stopper member 46 such as a circlip is provided on the backs side of the holding member 42. The stopper member 46 restricts the position of the holding member 42 along the direction of the driving shaft 11.

In the continuously variable transmission 1 according to the present embodiment having the configuration described above, the stopper member 46 such as a circlip restricts the position of the holding member 42 in the direction along the driving shaft 11. This ensures that the holding member 42 is supported. This further ensures the reinforcement of the movable half pulley 25 by the reinforcing member 41 secured by the holding member 42. This configuration and later described configuration applicable to the movable half pulley 25 can be similarly applied to the movable half pulley 55.

Figure 8:
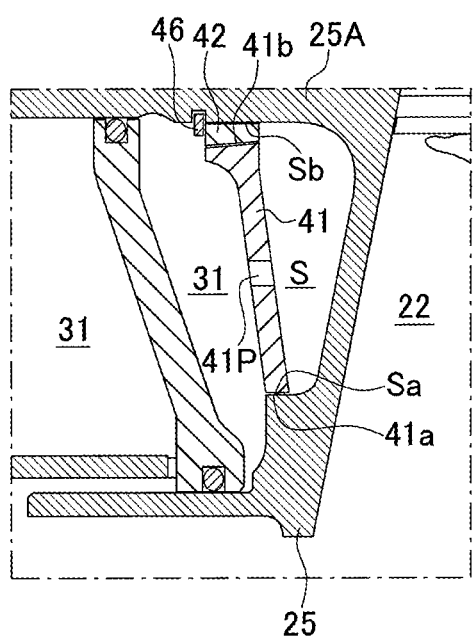
FIG. 8 is a diagram illustrating an example of a configuration according to a modification of the second embodiment.
Figure 9:
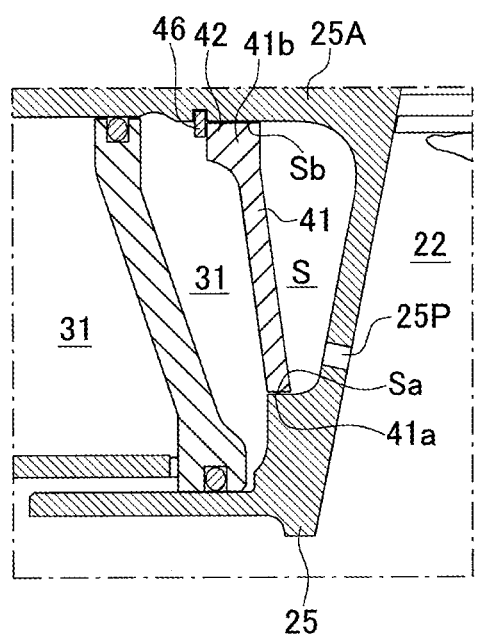
FIG. 9 is a diagram illustrating an example of a configuration according to another modification of the second embodiment.

In the second embodiment described above, the hollow part S is closed airtight with no pressure regulation port provided to the movable half pulley 25 or the reinforcing member 41. However, this should not be construed in a limiting sense. Next, a modification of the second embodiment is described. FIG. 8 and FIG. 9 are each a diagram illustrating an example of a configuration according to a modification of the second embodiment. As illustrated in FIG. 8, the reinforcing member 41 of the movable half pulley 25 may be provided with a pressure regulation port 41P serving as an entrance for the hydraulic fluid for operating the movable half pulley 25. The hydraulic pressure chamber 31 containing the hydraulic fluid is disposed on the back side of the reinforcing member 41 of the movable half pulley 25. With the pressure regulation port 41P thus provided the hydraulic fluid can enter through the pressure regulation port 41P to eliminate the pressure difference between the hydraulic pressure chamber 31 and the hollow part S. When the reinforcing member 41 might deform due to a pressure difference, caused by hydraulic pressure, on inner and outer sides of a surface of the reinforcing member 41, the pressure difference may be thus eliminated to reduce the load on the reinforcing member 41.

As illustrated in FIG. 9, the movable half pulley 25 serving as a part of the primary pulley 20 may be provided with a pressure regulation port 25P. Thus, a pressure difference involving the pressure in the hollow part S of the movable half pulley 25 can be utilized to effectively retain the reinforcing member 41. The movable half pulley 55 may be provided with a similar pressure regulation port 55P.

While the embodiments of the present invention have been described above, the present invention is not limited to the above embodiments, and various modifications may be made within the scope of the technical ideas described in the claims, specification, and drawings. The combination according to the first embodiment may be combined with the combination according to the second embodiment.

The invention claimed is:

1. A continuously variable transmission comprising:
   a rotation shaft;
   a pair of pulleys provided on the rotation shaft, the pulleys including nipping grooves receiving an endless transmission belt wound across the pulleys, the pulleys including half pulleys including at least one half pulley having a back side, opposite to the nipping groove, provided with a hollow part; and
   a reinforcing member having a center hole receiving the rotation shaft and tapering from an outer circumference side toward an inner circumference side to have an annular conical shape,
   wherein the reinforcing member has an outer circumference side end portion brought into contact with and attached to an outer circumference side end surface of the hollow part and has an inner circumference side end portion attached to an inner circumference side end surface of the hollow part via a holding member having a wedge-shaped cross section.

2. The continuously variable transmission according to claim 1, wherein the outer circumference side end portion and the inner circumference side end portion of the reinforcing member have tapered surfaces with same inclined angles relative to the rotation shaft.

3. The continuously variable transmission according to claim 1, wherein the reinforcing member is formed to have a cross-sectional area increasing from the outer circumference side end portion toward the inner circumference side end portion.

4. The continuously variable transmission according to claim 1, wherein the reinforcing member is made of a material having a Young's modulus higher than that of a material of the half pulleys.

5. The continuously variable transmission according to claim 1,
   wherein a shaft bearing is provided adjacent to the back side of at least one fixed half pulley of the pulleys, and
   wherein a biasing member that biases the holding member toward the nipping groove is disposed between the holding member and a part of the shaft bearing.

6. The continuously variable transmission according to claim 1,
   wherein a shaft bearing is provided adjacent to the back side of at least one fixed half pulley of the pulleys, and
   wherein a fastening member that restricts a position of the holding member along a direction along the rotation shaft is provided between the holding member and a part of the shaft bearing.

7. The continuously variable transmission according to claim 1,
   wherein a shaft bearing is provided adjacent to the back side of at least one fixed half pulley of the pulleys, and
   wherein the holding member comes into contact with a part of the shaft bearing having a position in a direction along the rotation shaft restricted with a stopper member.

8. The continuously variable transmission according to claim 1, wherein the holding member for at least one movable half pulley of the pulleys has a position in a direction along the rotation shaft restricted with a stopper member that restricts a position in the direction along the rotation shaft.

9. The continuously variable transmission according to claim 1, wherein the reinforcing member for at least one movable half pulley of the pulleys is provided with a pressure regulation port serving as an entrance for a hydraulic fluid for operating the movable half pulley.

10. The continuously variable transmission according to claim 1, wherein at least one movable half pulley of the pulleys is provided with a pressure regulation port.

* * * * *